May 1, 1923. 1,453,597
C. M. MOHLER
BRAKE EQUALIZER
Filed April 5, 1922
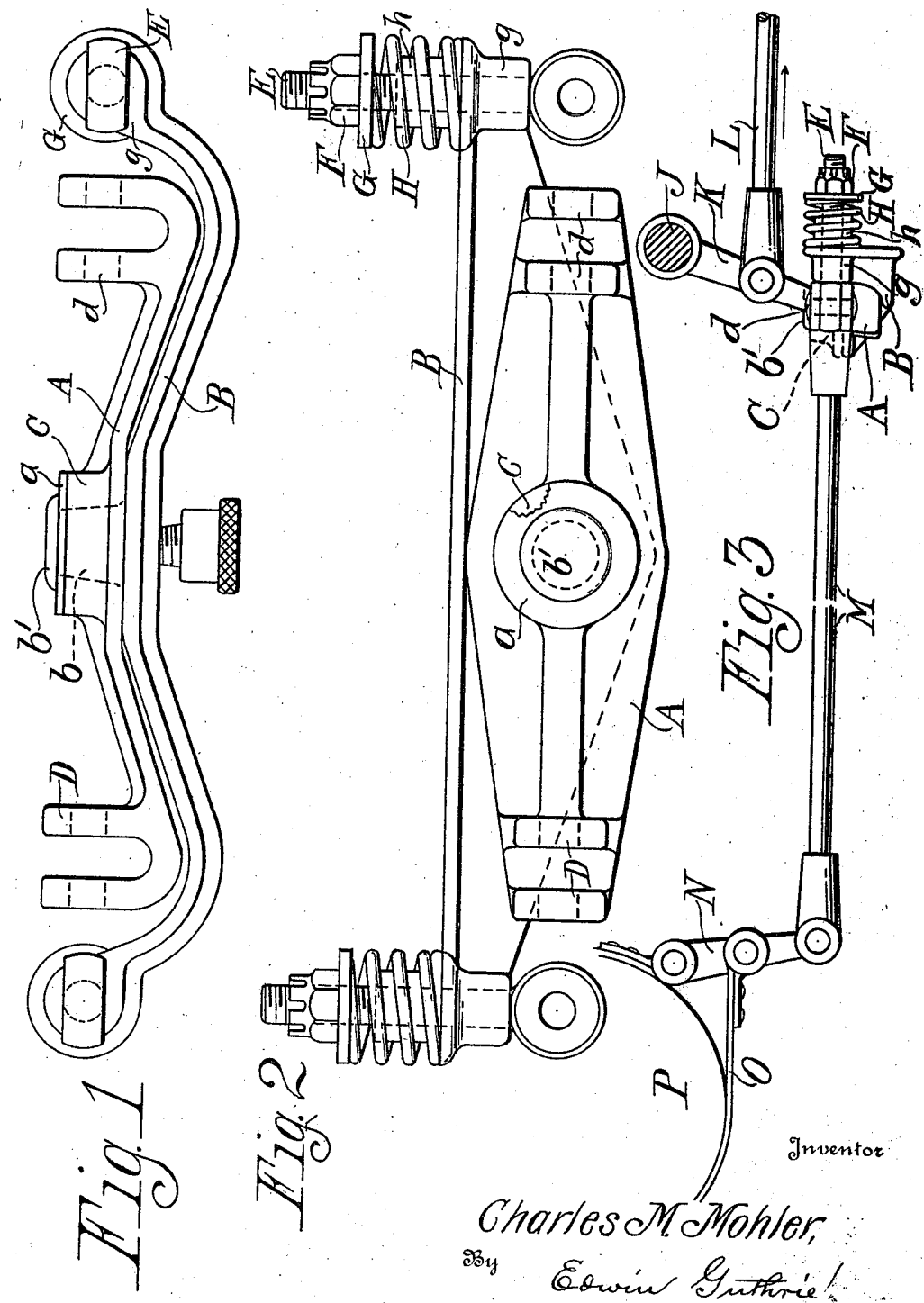
Inventor
Charles M Mohler,
By Edwin Guthrie
Attorney Patented May 1, 1923.

1,453,597

UNITED STATES PATENT OFFICE.

CHARLES MIKESELL MOHLER, OF YPSILANTI, MICHIGAN.

BRAKE EQUALIZER.

Application filed April 5, 1922. Serial No. 549,847.

*To all whom it may concern:*

Be it known that I, CHARLES M. MOHLER, citizen of the United States, residing at Ypsilanti, in the county of Washtenaw and State of Michigan, have invented certain new and useful Improvements in Brake Equalizers, of which the following is a specification.

This invention relates to brake equalizers, and belongs to that class of devices, which may be ordinarily altered in dimensions and particular forms of parts, to make them applicable to all vehicles, or braking mechanisms having two or more places or units of applying the braking force at the same time, and by one and the same pedal, lever or other applying means, such as the brakes of an automobile, in which case the pedal is the applying means for the service, or running brake, and a hand lever is the applying means for the emergency, and standing still or still brake; and the places or units of applying the braking force are the brake drums attached to the rear wheels.

This invention is applicable more especially to those automobiles having no means of automatically equalizing the brakes, and in which case the brakes are equalized as nearly as may be by a mechanic making adjustments and which is so often unsatisfactory. Nearly all brake mechanisms of this type have an intermediate or auxiliary brake shaft located amidship in the chassis frame. To this shaft are secured levers in fixed relationship to each other, two levers at or near the ends of this shaft and another or third lever is located somewhere between. The end levers receive or connect with the brake side rods which are the links between these levers and the rear wheel brake parts. In the application of this invention herein shown, there are only two levers secured to the intermediate brake shaft, one of which levers has two holes, one hole to connect with the brake pedal, and the other hole connects with one of the brake side rods. The other lever has one hole to which is connected the other brake side rod. The holes referred to in this description are the holes in the ends of the levers opposite the shaft ends. In the drawings but one of the two levers of the intermediate and transverse brake shaft is illustrated. It is the lever which has the two holes through it. In all cases this construction of brake equalizer as shown in the drawings and described in this application, attaches to the same levers on the intermediate brake shaft to which were connected the brake side rods. Primarily this invention is a swivel couple consisting of a main or base bar which attaches to the intermediate brake shaft side rod levers, and an equalizing bar to which are connected the front ends of the brake side rods.

In the accompanying drawings are illustrated the preferred construction and arrangement of the parts of this invention. Fig. 1 represents a front view. Fig. 2 is a top plan view. Fig. 3 is a side view, or end view, on a smaller scale, showing this invention connected with the lever of an intermediate brake shaft, and to one of the brake side rods.

Throughout the drawings and description, the same letter is used to refer to the same part.

Considering the drawings, it will be noted that the base bar A and the equalizing bar B, are both correspondingly bowed in their middle portions. Upon the middle point of the equalizing bar B is erected a tapering post or stud $b$, which passes upwardly and movably through a cylindrical raised middle portion C of the base bar A. The head $b'$ of the stud is riveted over on a washer $a$ placed upon the top of the raised middle C of the base bar A.

The base bar A has at its ends the U-shaped connecting devices for engaging the ends of the levers of an intermediate brake shaft. These connecting devices are designated D and $d$.

At the ends of the equalizing bar B are movable, reciprocating eye-bolts E. Upon each bolt is a castle nut F, bearing upon a washer G, and between the washer G and a base or spring seat $g$, which is in fact an enlarged end of the equalizing bar B, there is placed a coil spring H. Within the springs H will be noted a cylindrical continuation such as the part $h$ illustrated in Fig. 2, and the eye-bolt E passes also through this continuation as well as through the spring seat $g$. The spring H and the continuation $h$ are provided to permit the braking pull upon the parts to be first taken up yieldingly, and then positively, as further explained hereinbelow.

In its practical application, this invention is placed adjacent to an intermediate brake shaft J, having two levers or arms such as the lever K illustrated. As explained previously in this description, the lever K is the one that has two holes in it, to one of which is pivotally connected the rod L, leading to the common brake pedal not shown. The end of the lever K is provided with a hole for a pivot connecting the end of the lever with the connecting device $d$ best shown in Figs. 1 and 2. The intermediate brake shaft J, and its lever K, with the connected rod L are shown in Fig. 3, in which figure there is likewise illustrated one of the brake side rods M with which automobiles are commonly provided. The rod M connects with the brake strap lever N, which operates the brake band or strap O on the brake wheel P, all of the customary structure and function.

In explanation of the operation of this invention, attention is asked to the fact that when the rod L is drawn upon in the direction of the arrow, the intermediate brake shaft J is turned and by reason of its connections with the base bar A, that bar is also subjected to a pull in the same direction, the force as explained being exerted upon the connections D and $d$ at the ends of the base bar. The base bar has the middle and pivotal connection with the equalizing bar B, and the pull on the base bar results in a single force drawing upon the middle of the bar B. The bar B has its ends, by reason of the eye-bolt devices, connected with the brake side rods, and the force exerted upon the bar B is clearly equalized upon the brake parts on opposite sides of the automobile. When the eye-bolts E are first drawn upon, the force is yieldingly resisted by the springs H, but further force exerted in the same direction causes the cylindrical parts $h$, encircled by the springs, to contact with the washers G, whereupon the brakes are positively set up.

Having now described this invention, and explained the mode of its operation, what I claim is:—

1. In a brake equalizer, the combination with an equalizing bar having at its middle portion an upright stud, the said equalizing bar having at its ends means for connection with brake side rods, of a base bar having its middle portion pivotally engaging the said stud of the equalizing bar, the said base bar being arranged upon the said equalizing bar whereby one bar is directly over the other, and the said base bar having at its ends devices constructed to engage the levers of an intermediate brake shaft.

2. In a brake equalizer, the combination with an equalizing bar having at its middle portion an upright stud, the said equalizing bar having at its ends devices for connection with brake side rods, of a base bar having its middle portion pivotally engaging the said stud of the equalizing bar, the said base bar being arranged upon the said equalizing bar whereby one bar is directly over the other, and the said base bar having at its ends devices constructed to engage the levers of an intermediate brake shaft, both of said bars being bowed correspondingly in the middle portions thereof, and the horizontal center lines of the said connecting devices at the ends of the said bars lying in the same horizontal plane.

3. A brake equalizer, including a bar having at its ends connecting devices for brake side rods comprising a movable reciprocating member, a spring arranged to yieldingly resist the movement of the said member in one direction, and means for positively limiting the said movement in the same direction.

In testimony whereof I affix my signature.

CHARLES MIKESELL MOHLER.